United States Patent
Mackey et al.

(10) Patent No.: US 10,115,000 B2
(45) Date of Patent: Oct. 30, 2018

(54) METHOD AND SYSTEM FOR OPTICAL IMAGING USING PATTERNED ILLUMINATION

(71) Applicant: Synaptics Incorporated, San Jose, CA (US)

(72) Inventors: Bob Lee Mackey, San Jose, CA (US); Arash Akhavan Fomani, Saratoga, CA (US); Francis Lau, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/966,806

(22) Filed: Dec. 11, 2015

(65) Prior Publication Data

US 2017/0169275 A1     Jun. 15, 2017

(51) Int. Cl.
  *G06K 9/00*     (2006.01)
  *G09G 3/34*     (2006.01)

(52) U.S. Cl.
  CPC ....... *G06K 9/00013* (2013.01); *G09G 3/3406* (2013.01)

(58) Field of Classification Search
  CPC .......... G06K 9/00013; G06K 8/00019; G06K 9/00026; G06K 9/00084; G06K 9/00065; G09G 3/3406
  See application file for complete search history.

(56) References Cited

U.S. PATENT DOCUMENTS 5,629,764 A    5/1997  Bahuguna et al.
6,097,035 A *  8/2000  Belongie ............ G06K 9/00026
                                                           250/556
6,720,942 B2   4/2004  Lee et al.
7,230,608 B2   6/2007  Cok
7,532,182 B2   5/2009  Tseng et al.
7,697,053 B2   4/2010  Kurtz et al.

(Continued)

FOREIGN PATENT DOCUMENTS

CN      102073860 A      5/2011
DE    102005012443 A1    9/2006

(Continued)

OTHER PUBLICATIONS

Fraunhofer FEP, Smart Optoelectronic Microsensors by OLED-on-Silicon, brochure published 2017.

(Continued)

*Primary Examiner* — Amir Alavi (74) *Attorney, Agent, or Firm* — Leydig, Voit & Mayer, Ltd.

(57) ABSTRACT

Systems and methods for optical imaging are disclosed. An electronic device for imaging an input object includes a display comprising a sensing surface and an array of display pixels. The electronic device also includes a processing system communicatively coupled to the display, the processing system configured to: selectively illuminate one or more of the display pixels according to a pattern; acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern.

26 Claims, 7 Drawing Sheets

(56) References Cited

U.S. PATENT DOCUMENTS

| | | | |
|---|---|---|---|
| 7,920,130 B2 | 4/2011 | Tien | |
| 8,792,174 B2 | 7/2014 | Schmaelzle et al. | |
| 8,917,387 B1 | 12/2014 | Lee et al. | |
| 8,922,866 B2 | 12/2014 | Brueckner et al. | |
| 8,963,886 B2 | 2/2015 | Wassvik | |
| 9,035,917 B2 | 5/2015 | Jansson et al. | |
| 9,046,961 B2 | 6/2015 | King et al. | |
| 9,066,379 B2 | 6/2015 | Kreye et al. | |
| 9,454,261 B2 | 9/2016 | Duparre et al. | |
| 9,507,412 B2 | 11/2016 | Herold et al. | |
| 9,836,165 B2 | 12/2017 | Nho et al. | |
| 2002/0054695 A1* | 5/2002 | Bjorn | G06F 3/03547 382/124 |
| 2003/0090650 A1* | 5/2003 | Fujieda | G06K 9/0004 356/71 |
| 2004/0252867 A1 | 12/2004 | Lan et al. | |
| 2007/0096125 A1 | 5/2007 | Amelung et al. | |
| 2007/0242003 A1 | 10/2007 | Vogel et al. | |
| 2008/0054275 A1 | 3/2008 | Vogel et al. | |
| 2008/0054276 A1 | 3/2008 | Vogel et al. | |
| 2008/0069412 A1* | 3/2008 | Champagne | G06K 9/00013 382/124 |
| 2008/0121442 A1 | 5/2008 | Boer et al. | |
| 2008/0122371 A1 | 5/2008 | Bunk et al. | |
| 2009/0041391 A1* | 2/2009 | Wang | H01L 27/14625 382/321 |
| 2009/0134309 A1 | 5/2009 | Leo et al. | |
| 2009/0212303 A1 | 8/2009 | Amelung et al. | |
| 2010/0012817 A1 | 1/2010 | Amelung et al. | |
| 2010/0208953 A1* | 8/2010 | Gardner | G06K 9/00006 382/124 |
| 2010/0321305 A1 | 12/2010 | Chang et al. | |
| 2012/0321149 A1* | 12/2012 | Carver | G06K 9/0004 382/124 |
| 2014/0103328 A1 | 4/2014 | Pfeifer et al. | |
| 2014/0145939 A1 | 5/2014 | Herold et al. | |
| 2015/0331508 A1 | 11/2015 | Nho et al. | |
| 2015/0364107 A1 | 12/2015 | Sakariya et al. | |
| 2015/0369661 A1 | 12/2015 | Lin | |
| 2016/0092717 A1 | 3/2016 | Ling | |
| 2016/0132712 A1 | 5/2016 | Yang et al. | |
| 2016/0246396 A1 | 8/2016 | Dickinson et al. | |
| 2016/0247010 A1 | 8/2016 | Huang et al. | |
| 2016/0283772 A1 | 9/2016 | Nelson | |
| 2016/0314334 A1* | 10/2016 | He | G06K 9/0012 |
| 2017/0124370 A1 | 5/2017 | He et al. | |
| 2017/0169275 A1* | 6/2017 | MacKey | G06K 9/00013 |

FOREIGN PATENT DOCUMENTS

| | | |
|---|---|---|
| DE | 102006030536 B3 | 2/2008 |
| DE | 102010030353 A1 | 12/2011 |
| WO | 2004/086527 A1 | 10/2004 |
| WO | WO 2006/097129 A1 | 9/2006 |
| WO | WO 2013/156576 A1 | 10/2013 |
| WO | WO 2015/041459 A1 | 3/2015 |
| WO | 2015/140600 A1 | 9/2015 |
| WO | WO 2016/012276 A1 | 1/2016 |
| WO | WO 2016/041978 A1 | 3/2016 |
| WO | WO 2016/055365 A1 | 4/2016 |
| WO | WO 2016/154378 A1 | 9/2016 |
| WO | WO 2016/198382 A1 | 12/2016 |

OTHER PUBLICATIONS

U.S. Appl. No. 62/078,427, dated Nov. 12, 2014, to Shenzhen Goodix Technology Co., Ltd., Patent Proposal, "Ultra thin optical fingerprint sensor", Yang Meng-Ta, website: www.goodix.com.

Priority document submitted to International Bureau for PCT/US2016/023891, U.S. Appl. No. 62/138,107, filed Mar. 25, 2015.

U.S. Appl. No. 62/249,832, filed Nov. 2, 2015, entitled "Multifunction Fingerprint Sensor Having Optical Sensing", Yi He.

\* cited by examiner

METHOD AND SYSTEM FOR OPTICAL IMAGING USING PATTERNED ILLUMINATION

FIELD

This disclosure generally relates to optical imaging, and more particularly optical imaging using patterned illumination in a display.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices.

Most commercially available fingerprint sensors are based on optical or capacitive sensing technologies. Unfortunately, conventional optical fingerprint sensors are too bulky to be packaged in mobile devices and other common consumer electronic devices, confining their use to door access control terminals and similar applications where sensor size is not a restriction. As a result, fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each pixel in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

SUMMARY

One embodiment of the disclosure provides an electronic device for imaging an input object. The electronic device includes a display comprising a sensing surface and an array of display pixels. The electronic device also includes a processing system communicatively coupled to the display, the processing system configured to: selectively illuminate one or more of the display pixels according to a pattern; acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern.

Another embodiment of the disclosure provides an electronic device for imaging an input object. The electronic device includes a processing system configured to be communicatively coupled to a display. The processing system is configured to selectively illuminate one or more display pixels of the display according to a pattern; acquire image data, from one or more detector pixels of the display, of an input object in contact with a sensing surface of the display, wherein the image data corresponds to light from the illuminated display pixels that is reflected at the sensing surface of the display; and process an image of the input object from the image data based upon the pattern.

Another embodiment of the disclosure provides a method for imaging an input object. The method includes selectively illuminating one or more display pixels of a display according to a pattern; acquiring image data, at one or more detector pixels of the display, of the input object in contact with a sensing surface of the display, wherein the image data corresponds to light from the illuminated display pixels that is reflected at the sensing surface of the display; and processing an image of the object from the image data based on the pattern.

Another embodiment of the disclosure provides an electronic device for imaging a fingerprint. The electronic device includes a display comprising a sensing surface, an array of display pixels and an array of detector pixels. The electronic device also includes a processing system communicatively coupled to the display, wherein the processing system is configured to: detect the fingerprint in contact with the sensing surface; selectively illuminate one or more of the display pixels according to a pattern; acquire image data of the fingerprint at one or more of the detector pixels according to the pattern; and compare the acquired image data of the fingerprint to stored image data.

Another embodiment of the disclosure provides an electronic device for imaging a fingerprint. The electronic device includes a display comprising a sensing surface, an array of display pixels and an array of detector pixels and a processing system communicatively coupled to the display. The processing system configured to illuminate a first set of one or more of the display pixels and illuminate a second set of one or more of the display pixels; acquire partial image data from a first set of the detector pixels during illumination of the first set of one or more display pixels and acquire partial image data from a second set of the detector pixels during illumination of the second set of one or more display pixels, wherein the first set of detector pixels is selected from a first region surrounding the first set of one or more display pixels, wherein the second set of detector pixels is selected from a second region surrounding the second set of one or more display pixels; combine the partial image data from the first set of detector pixels and the partial image data from the second set of detector pixels into composite fingerprint image data; and compare the composite fingerprint image to an enrolled fingerprint template to determine a biometric match.

Another embodiment of the disclosure provides a method for imaging a fingerprint. The method includes illuminating a first set of one or more display pixels of a display and illuminating a second set of one or more display pixels of the display; acquiring partial image data from a first set of detector pixels of the display during illumination of the first set of one or more display pixels and acquiring partial image data from a second set of detector pixels of the display during illumination of the second set of one or more display pixels, wherein the first set of detector pixels is selected from a first region surrounding the first set of one or more display pixels, wherein the second set of detector pixels is selected from a second region surrounding the second set of one or more display pixels; combining the partial image data from the first set of detector pixels and the partial image data from the second set of detector pixels into composite fingerprint image data; and comparing the composite fingerprint image to an enrolled fingerprint template to determine a biometric match.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings or the following detailed description.

Turning to the drawings, and as described in greater detail herein, embodiments of the disclosure provide systems and methods to optically image an input object such as a fingerprint. In particular, a method and system is described wherein display pixels of a display are illuminated according to various patterns. Detector pixels of the display are then selectively used to image all or part of an input object, e.g., all or part of the fingerprint. The images may then be further processed, such as may be done for use in a biometric matching process and/or to reproduce a complete image. Additional advantages and features will be apparent from the disclosure which follows. By way of example, although the description is generally directed to optically imaging fingerprints, it will be understood that the system and method describe a way to image other input objects.

Figure 1:
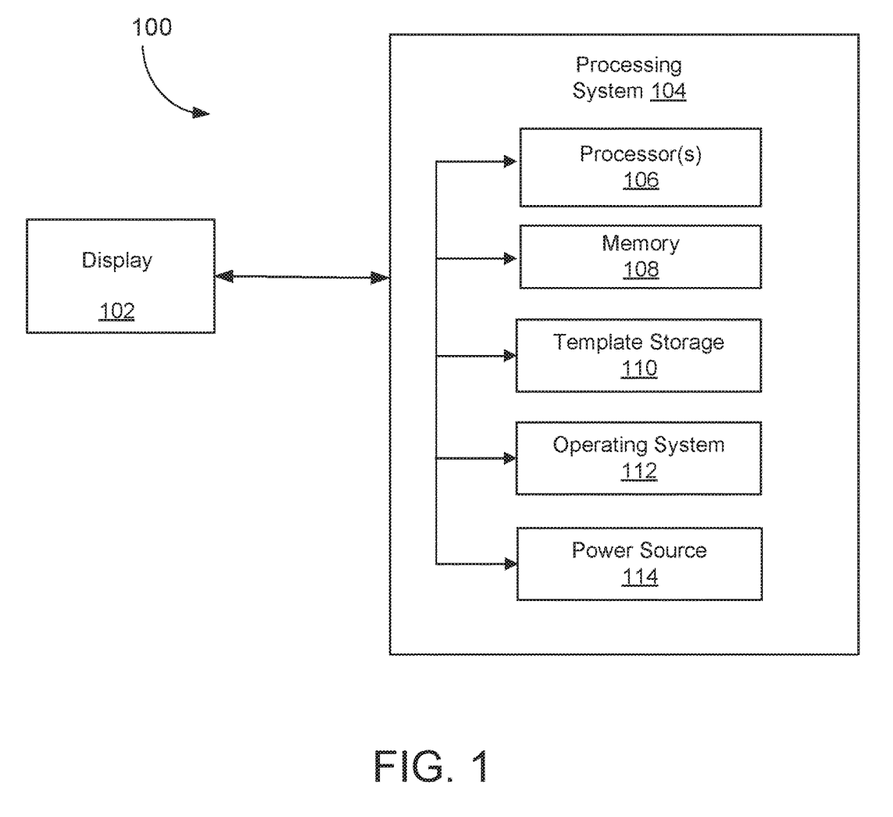
FIG. 1 is a block diagram of an example of a system that includes a display device and a processing system, according to an embodiment of the disclosure.

FIG. 1 is a block diagram of an example of an electronic system 100 that includes a display device 102 and a processing system 104, according to an embodiment of the disclosure. In accordance with the disclosure, the display device 102 is also used as a sensor for imaging.

By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. More generally, the template storage 110 may be used to store information about an input object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Display 102 can be implemented as a physical part of the electronic system 100, or can be physically separate from the electronic system 100. As appropriate, the display 102 may communicate with parts of the electronic system 100 using any one or more of the following: buses, networks, and other wired or wireless interconnections. In some embodiments, display 102 is implemented as a fingerprint sensor to capture a fingerprint image of a user. More generally, the display 102 is implemented to image an object. In accordance with the disclosure, the display 102 uses optical sensing for the purpose of object imaging including imaging biometrics such as fingerprints.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

Figure 2:
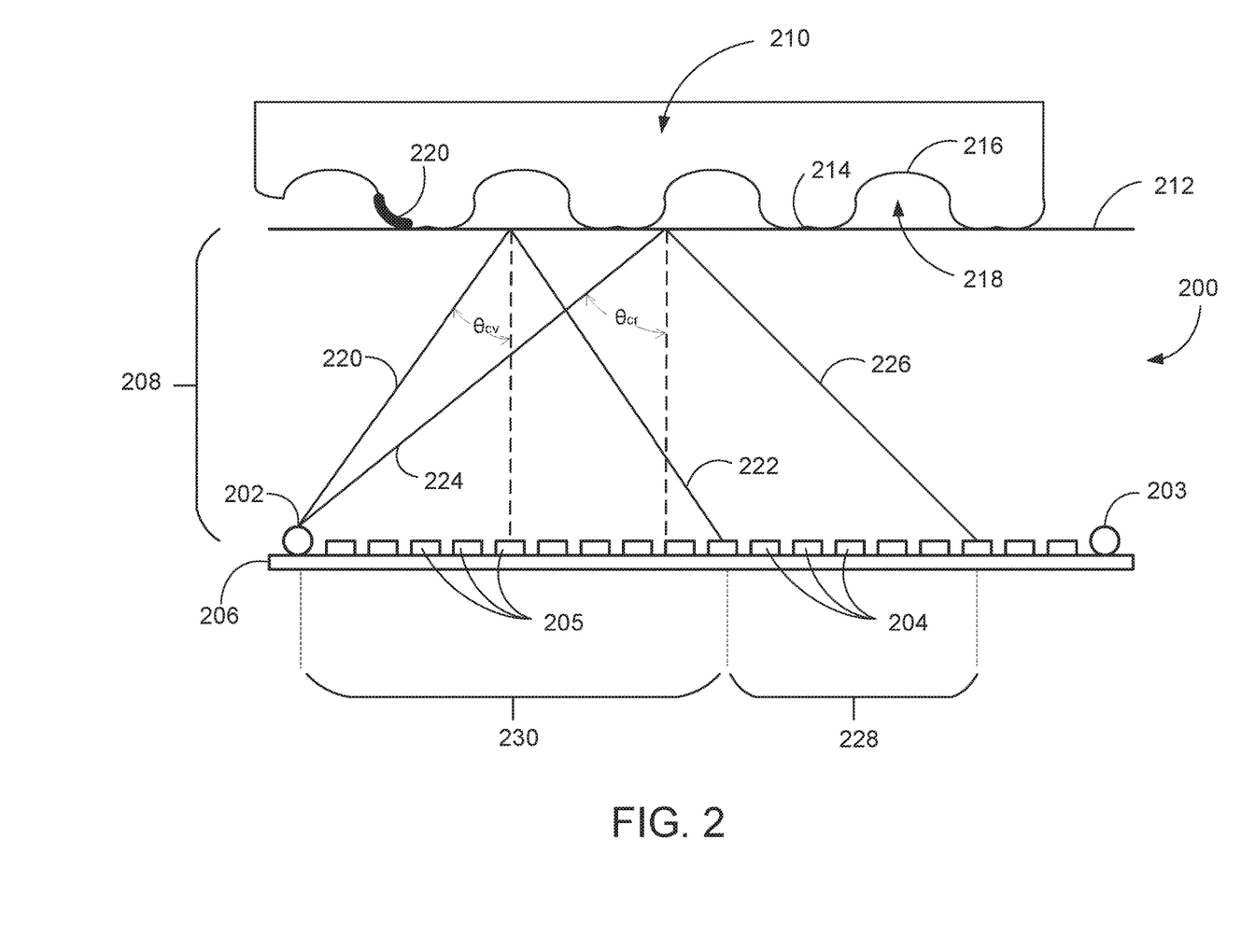
FIG. 2 illustrates a display according to an embodiment of the disclosure.

FIG. 2 illustrates an example of a display 200 according to the present disclosure. The display 200 includes display pixels, e.g., display pixels 202 and 203, detector pixels, e.g., detector pixels 204 and 205, a substrate 206, and a cover layer 208. Also shown is an input object 210, which according to the disclosure, and as described in detail below, is imaged by the display 200. As described above, the display 200 may be a separate device or may be incorporated as part of various devices including mobile phones, media devices, and any other electronic device 100.

The display pixels 202 and 203 are of any suitable type. By way of example, suitable display pixels include light emitting diodes (LEDs) and organic light emitting diodes (OLEDs). Other sources of illumination may be used including, without limitation, backlighting in a liquid crystal display (LCD). Although only two display pixels are shown in FIG. 2, an array of display pixels are used which may include any number and arrangement of display pixels. The display pixels 202 may transmit light of the same wavelength or may transmit light of differing wavelengths (e.g., different colors). Moreover, wavelengths other than visible light may be used.

In general, the detector pixels 204 and 205 detect light transmitted from display pixels 202. Examples of types of detector pixels 204 are CMOS sensors, phototransistors and photodiodes. Thin film transistor sensors may also be used according to the disclosure.

Although the display pixels 202, 203 and detector pixels 204, 205 are depicted as distinct elements, it will be understood that the same type of element may be used to both transmit light and detect transmitted light. For example, the display pixels themselves may be reverse-biased to function as detector pixels, using LED, OLED, or another suitable display technology. The display pixels can be individually set to reverse biased detector pixels, or set in a row or column fashion. Further, all of the display pixels may be addressable in a reverse biased state, or some smaller subset may be addressable in a reverse bias state in order to minimize the amount of additional routing circuitry that is included, in which case the display might include a special area of fingerprint sensing corresponding to those pixels that can be set to a reverse biased detector state. In addition, although the detector pixels are shown on the same substrate 208 as the display pixels, the detector pixels can be otherwise arranged within the device, such as for example, on a different plane from the display pixels.

The cover layer 208 may include a cover lens, also referred to as a cover glass, which protects the inner components of the display, such as the display pixels 202, 203 and the detector pixels 204, 205. The cover lens may be made of any material such as chemically strengthened glass, crystalline materials (e.g., synthetic sapphire), transparent polymeric materials, and the like. The cover layer 208 may also include one or more additional layers associated with display and/or touch screen functionality. The cover layer 208 may be transparent thereby allowing light from the display pixels 204, 205 to be transmitted and observed outside of the display 200. A top surface of the cover layer 208 forms a sensing surface 212 which provides a contact area for the input object 210.

The input object 210 is an object to be imaged such as a fingerprint. Generally, the object 210 will have various characteristics. By way of example, the object 210 has ridges 214 and valleys 216. Due to their protruding nature, the ridges 214 contact the sensing surface 212 of the cover 208. In contrast, the valleys 216 do not contact the sensing surface 212 and instead form a gap 218 between the input object 210 and the sensing surface 212. The object 210 may have other characteristics such as stain or ink 220 that do not create significant structural differences in portions of the input object 210, but which affect its optical properties.

The display pixels 202 transmit beams of light within the cover layer 208 and the transmitted light becomes incident on the sensing surface 212 of the cover layer 208 at various angles. At certain angles, some of the transmitted light is reflected and some of the transmitted light is refracted. However, light beams transmitted from the display pixel 204 which arrive at the sensing surface 212 at an angle exceeding a critical angle $\theta_c$ undergo total internal reflection, i.e., all light from the transmitted beam is reflected at the sensing surface 212.

As will be appreciated, since the medium above the sensing surface 212 will vary, the critical angle at various points along the sensing surface 212 will likewise vary. For example, the ridges 214 of the input object 210 and gaps 218 formed within the valleys 216 of the object will have different indices of refraction. As a result, different critical angles will exist at the boundaries between the sensing surface 212 and ridges 214 as compared to the boundaries formed by the air gaps 218 and the sensing surface 212. These differences are illustratively shown in FIG. 2. Line 220 represents a beam of light transmitted from the display pixel 202 at the critical angle ($\theta_{cv}$) for a gap 218 and sensing surface 212 boundary, and line 222 represents the corresponding reflected beam. Line 224 represents a beam of light transmitted at the critical angle ($\theta_{cr}$) for a ridge 214 and sensing surface 212 boundary, and line 226 represents a corresponding reflected beam. Relative to display pixel 202, region 228 depicts an area on the substrate 206 that is bounded by reflected light resulting from light beams transmitted at the critical angles $\theta_{cv}$ and $\theta_{cr}$, or in other words is bounded by reflected beams 222 and 226.

In accordance with one aspect of the disclosure, detector pixels falling within region 228, e.g., detector pixels 204, are used to detect reflected light to image part of input object 210 when display pixel 202 is illuminated. With respect to the detection of ridges and valleys, region 228 is an area of relatively high contrast. The relative high contrast occurs because light reflected from the sensing surface in contact with valleys (e.g., air) undergoes total internal reflection whereas light reflected from the sensing surface 212 in contact with the input object 210 (e.g., skin) does not. Thus, light beams transmitted from display pixel 202 which have an angle of incidence at the sensing surface falling between $\theta_{cv}$ and $\theta_{cr}$ are reflected and reach detector pixels 204 falling within region 228.

In accordance with another aspect of the disclosure, detector pixels 205 falling within region 230 (relative to display pixel 202) may also be used to image the input object 210. In particular, transmitted beams from detector pixel 202 which become incident on the sensing surface 212 with angles smaller than both critical angle of ridge ($\theta_{cr}$) and critical angle of valley ($\theta_{cv}$) result in reflected beams falling within region 230. Due to scattering, the contrast of reflected beams falling within region 230 from ridges and valleys may be less than the contrast of reflected beams falling within high contrast region 228. However, depending on the sensitivity of the detector pixels 204 and resolution requirements, region 230 may still be suitable for sensing ridges and valleys on the input object 210. Moreover, region 230 will generally be suitable for detecting non-structural optical variations in the input object 210 such as stains or ink 220.

It will be appreciated that the reflected light beams detected in region 228 provide a magnified view of a partial image of the input object 210 due to the angles of reflection. The amount of magnification depends upon the distance between the display pixels 202 and the sensing surface 212 as well as the distance between the detector pixels 204 and the sensing surface 212. For example, if the display pixels 202 and the detector pixels 204 are coplanar, then the distance between the display pixels 202 and the sensing surface 212 may be equivalent to the distance between the detector pixels 204 and the sensing surface 212. In such a case, the partial image of the input object 210 may undergo a two-times magnification (2×) based on a single internal reflection from the sensing surface 212 reaching the detector pixels in region 228.

The critical angles $\theta_{cr}$ and $\theta_{cv}$ resulting from ridges 214 and gaps 218 at the sensing surface 212 are dependent on the properties of medium in contact with the boundary formed at the sensing surface 212, which may be affected by a condition of the input object. For example, a dry finger in contact with the sensing surface may result in a skin to air variation across the sensing surface corresponding to fingerprint ridges and valleys, respectively. However, a wet finger in contact with the sensing surface may result in a skin to water or other liquid variation across the sensing surface. Thus, the critical angles of a wet finger may be different from the critical angles formed by the same finger in a dry condition. Thus, in accordance with the disclosure, the intensity of light received at the detector pixels can be used to determine the relative critical angles, determine whether the object is wet or dry and/or adjust the detector pixels used for capturing the image of the object. If a wet object is detected, a user may also be notified so that the object can be dried before imaging.

Figure 3:
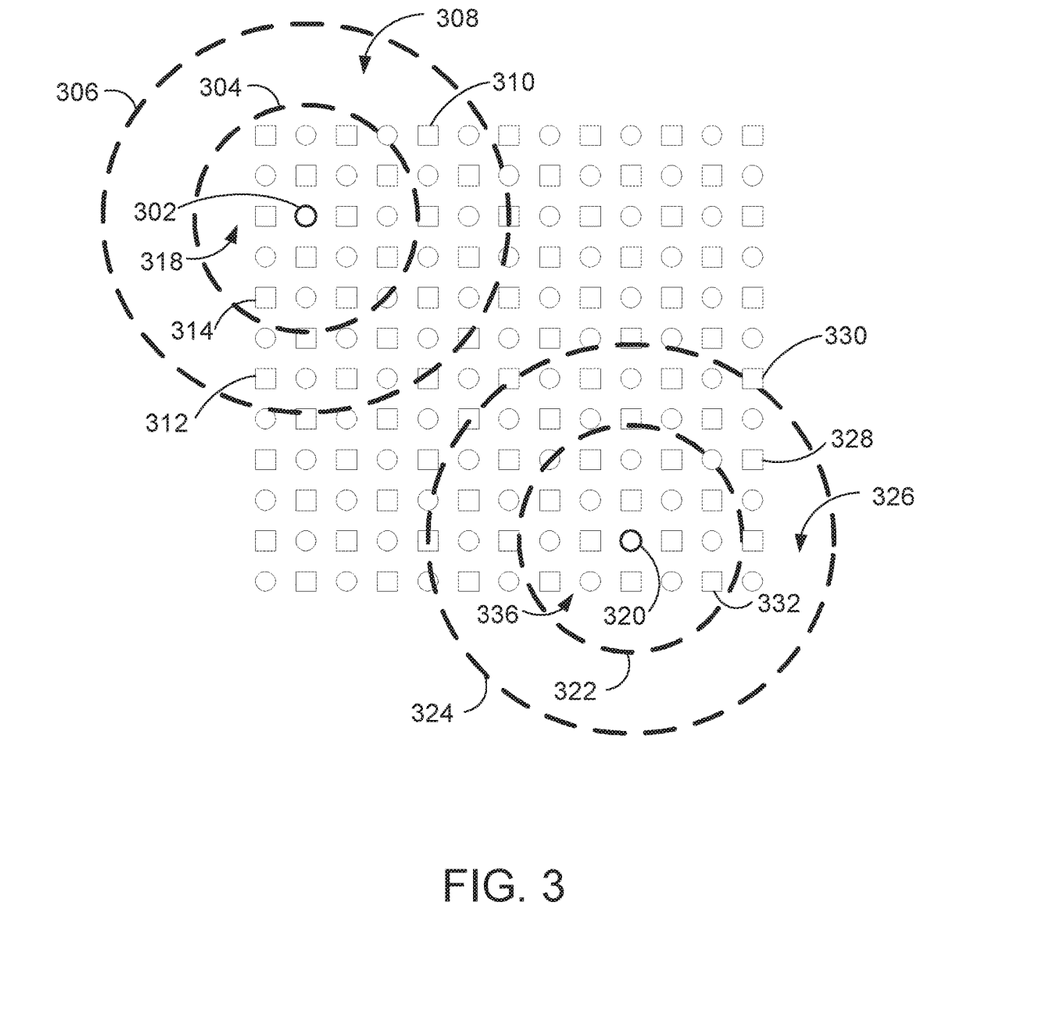
FIG. 3 illustrates an array of sensor pixels and an array of display pixels operating in a pattern according to an embodiment of the disclosure.

FIG. 3 illustrates a plan view of an example of a display according to the present disclosure wherein various display pixels (circles) and detector pixels (squares) are located on the same plane or parallel planes, and wherein the sensing surface lies in a plane that is parallel to the detector pixel plane and the display pixel plane. In the example, display pixel 302 is illuminated for the purpose of imaging a portion of the input object 210 (FIG. 2). Concentric circles 304 and 306 illustrate boundaries of a high contrast region 308, which as described above will depend on the dimensions of the display as well as the critical angles $\theta_{cr}$ and $\theta_{cv}$.

In certain embodiments, when display pixel 302 is illuminated, detector pixels falling within the high contrast region 308, such as detector pixels 310 and 312 are used to detect reflected light from the display pixel 302 to image a portion of the input object. In other embodiments, or in combination with the collection of data from region 308, detector pixels, such as detector pixels 314 falling within region 318 may be used.

Also shown in FIG. 3 is a second display pixel 320. Concentric circles 322 and 324 illustrate boundaries of a second high contrast region 326, which corresponds to display pixel 320. Detector pixels within region 326, such as detector pixels 328 and 330, are used to collect data corresponding to the object to be imaged. In other embodiments, or in combination with the collection of data from region 326, detector pixels, such as detector pixel 332 falling within region 336 may be used.

In the example of FIG. 3, high contrast region 308 and high contrast region 326 are non-overlapping. It will be understood, however, that regions 308 and 336 may overlap. In the case of overlapping high contrast regions, display pixels 302 and 320 may be illuminated at different times, as discussed in connection with FIGS. 4A-4B below. Alternatively, provision is made to distinguish the light transmitted from display pixel 302 as compared to the light transmitted from display pixel 320 in which case display pixels 302 and 320 may be simultaneously illuminated while data is collected within their respective high contrast regions. When display pixels 302 and 320 are simultaneously illuminated as part of object imaging, FIG. 3 provides an example of object imaging using a spatial pattern.

It will be understood that FIG. 3 illustrates only the illumination of two display pixels and each display pixel includes corresponding detection regions with which data is collected for partial images of the input object. In operation, the system and method contemplate the illumination of as many display pixels as necessary to capture enough partial images to make up a larger image, or complete image of the object. It will also be understood that various display pixels may be independently used for displaying visual information simultaneously while selected pixels are illuminated for object imaging.

Figure 4A:
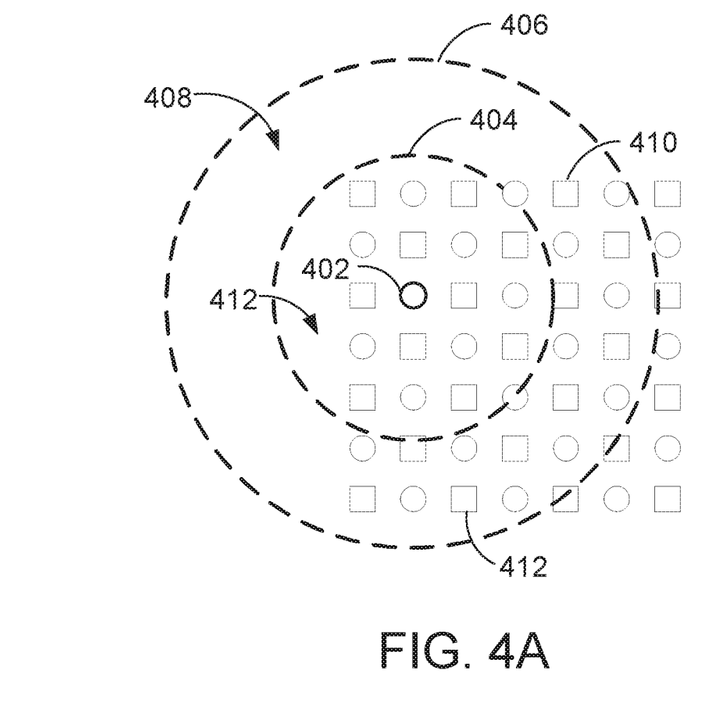
FIGS. 4A-4B illustrate an array of sensor pixels and an array of display pixels operating in a pattern according to an embodiment of the disclosure.
Figure 4B:
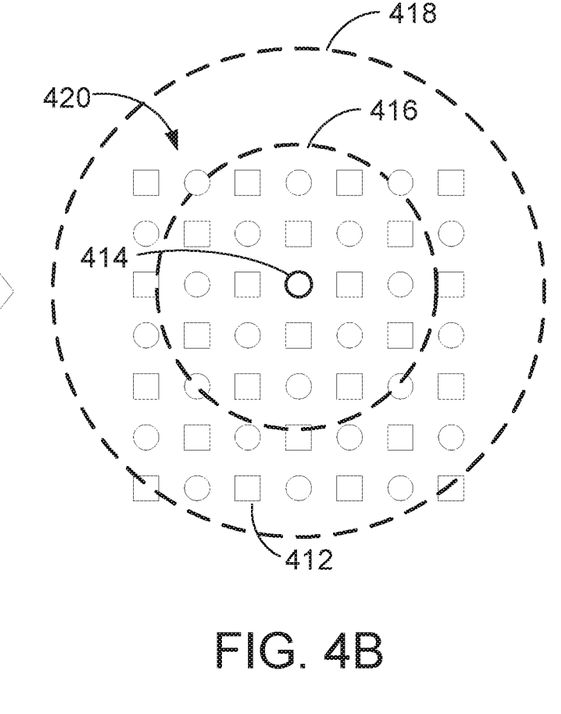

FIGS. 4A-4B show a series of plan views of the display according to the present disclosure, which illustrates an example of object imaging using a temporal pattern. In FIG. 4A, display pixel 402 is illuminated. Concentric circles 404 and 406 identify the boundaries of high contrast area 408 corresponding to display pixel 402. Thus, according to the disclosure, detector pixels within the high contrast area 408, such as detector pixels 410 and 412, are used to collect data corresponding to ridges and valleys, or other surface features, from the object 212 to be imaged. Alternatively, or in combination with the foregoing, detector pixels within region 412, which is radially inward from boundary 404, may be used.

FIG. 4B represents the same set of display pixels and detectors pixels as FIG. 4A, but at a different time. Display pixel 414 is illuminated. As will be noted, the concentric circles 416 and 418 identifying the boundaries of corresponding high contrast region 420 have moved relative to the high contrast region 408 of FIG. 4A. Thus, the subset of detector pixels falling in the high contrast area have changed, although some pixels may fall with both high contrast areas 408 and 420 such as detector pixel 412.

In the example of FIGS. 4A and 4B, the various high contrast regions 408 and 420 overlap. However, illumination of the display pixels 402 and 414 are temporally spaced. For example, display pixel 402 is illuminated. After the data is collected from within region 408, display pixel 402 is turned off. Display pixel 414 is then illuminated and data is collected from within region 420. After data is collected from within region 420, display pixel 414 is turned off. This process continues using as many display pixels as necessary to capture enough partial images to form a larger or complete image of the input object as desired. As previously described, the disclosure also contemplates the simultaneous illumination of multiple display pixels having overlapping high contrast areas provided that the reflected light received from the different illumination pixels can be resolved.

Figure 5:
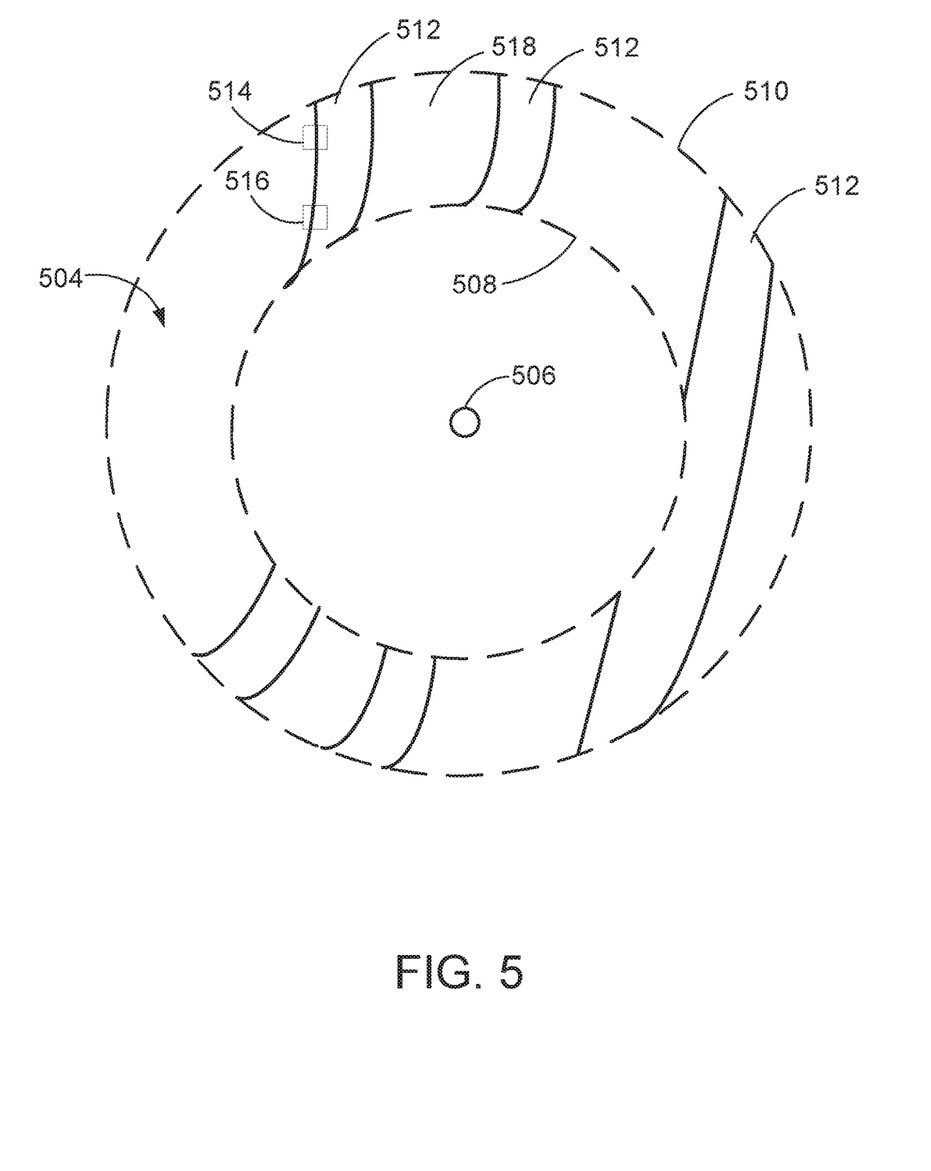
FIG. 5 illustrates a portion of a fingerprint superimposed onto a detection region according to an embodiment of the disclosure.

FIG. 5 illustrates a plan view of a partial image of an object superimposed onto a high contrast region 504, which is imaged during illumination of display pixel 506. Concentric circles 508 and 510 show the boundaries of the high contrast region 504. Portions 512 correspond to ridges of the input object. Other areas within the high contrast region 504 correspond to valleys 518 of the input object. As previously described, due to the angles of reflection undergone by light transmitted by display pixel 506, the ridges and the valleys detected in the high contrast region 504 are magnified as compared the actual ridges and valleys on the object. The amount of magnification depends on the geometry of the display including the distance between the display pixels, detector pixels, and the sensing region. Moreover, detector pixels further away from the display pixel 506, e.g., detector pixel 514, will receive lower intensity reflected light as compared to detector pixels closer to the display pixel, e.g., detector pixel 516 because the intensity of light decreases in relation to the distance it travels.

In some applications, image data from various partial images obtained during patterned illumination of the individual display pixels is combined into composite image data of the input object. The partial image data may be aligned based on known spatial relationships between the illumination pixels in the pattern. By way of example, the partial image data may be combined by stitching together the partial images into a larger image, or by generating a map that relates the image data from the various partial images according to their relative alignments. Demagnification of the images may be useful prior to such piecing together or mapping. In addition, it may be useful to apply a weighting function to the image data to account for the different intensities of light received at detector pixels having different distances from the display pixels. In some applications, if pixels inside of region 508 are used, the resulting data from the various partial images may be deconvolved to reconstruct the larger image. Alternatively, the data inside of this region may convey sufficient information for some applications, so that no deconvolution is needed.

Figure 6:
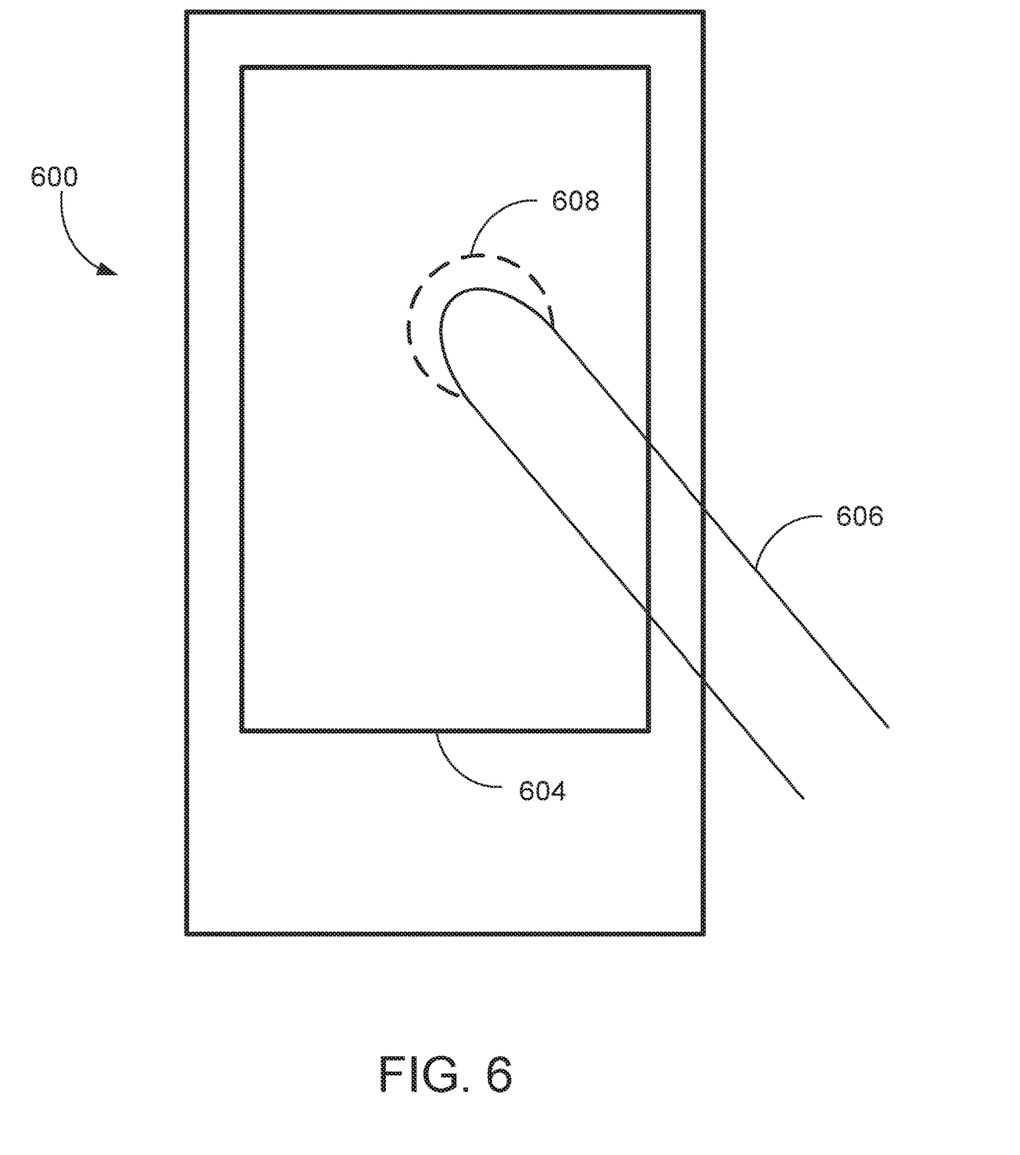
FIG. 6 illustrates a display providing visual feedback during optical imaging of an input object according to an embodiment of the disclosure.

FIG. 6 illustrates a way to provide feedback during imaging of an object using a display according to the present disclosure. Such feedback may be used, for example, to provide feedback to a user during acquisition of a fingerprint image in an enrollment and/or authentication process.

As shown, the device 600 includes a display area 604. An object 606, such as a finger, is placed over and in contact with the display area 604. Display pixels underneath the object 606 are illuminated according to a pattern to image part or all of the object 606 in accordance with the previous description. During or after imaging of the object 606, display pixels at or about the perimeter of the object 606 are illuminated to provide a visually perceptible border 608. The displayed border 608 may change in appearance to signify status. For example, while the object 606 is being imaged and/or during an authentication period, the border could be a first color (e.g., yellow). Once the imaging and authentication is completed, the color could change to a second color (e.g., green) if the authentication is successful or a third color (e.g., red) if the authentication is unsuccessful. It will be appreciated that changes in color provides one example of how the border 608 may be altered to signal status to the user. Other changes in the appearance of the border, such as a change from dashed line to a solid line, or an overall change in the shape of the border could be employed as well.

Figure 7:
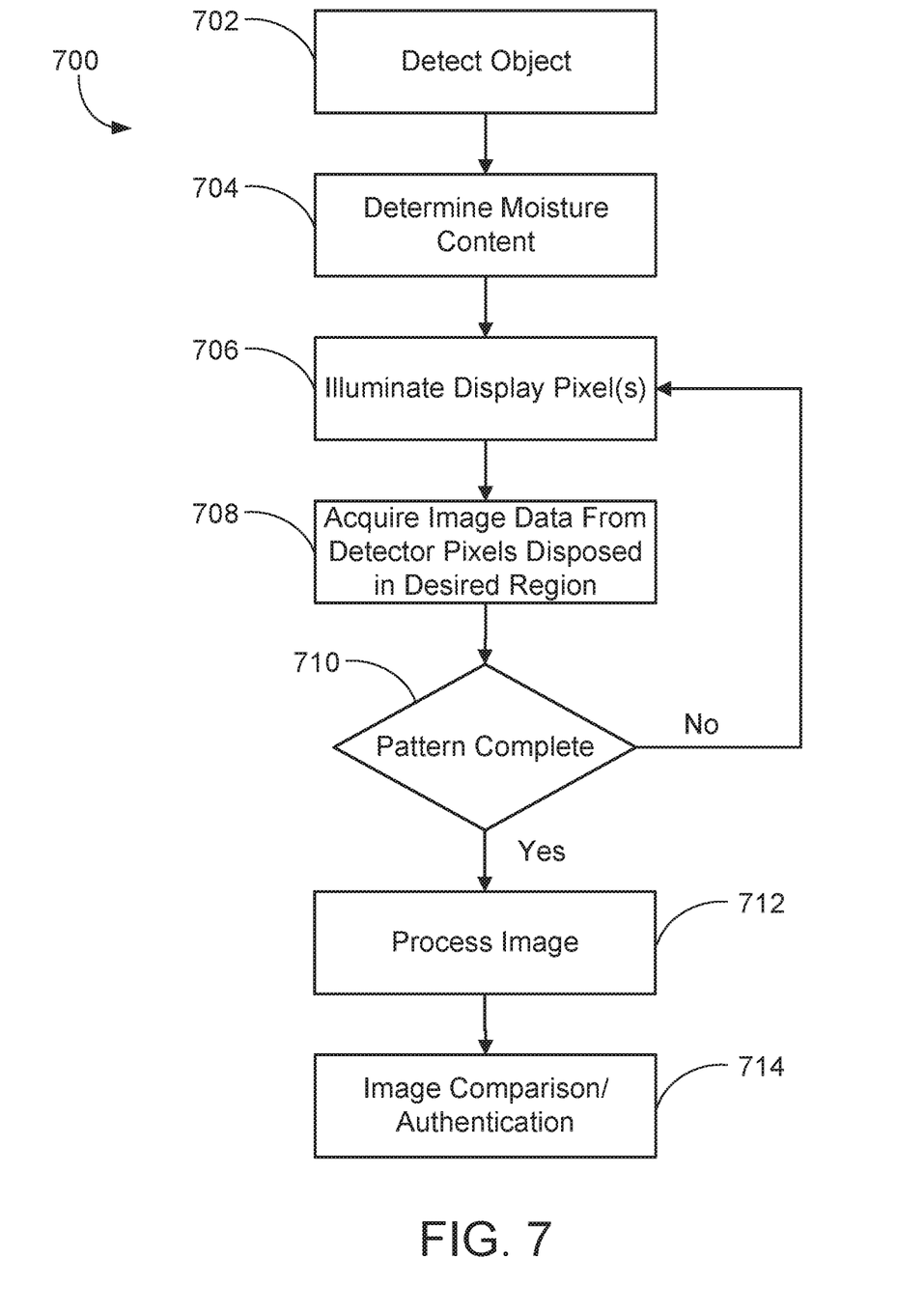
FIG. 7 illustrates a method of optical imaging using patterned illumination according to an embodiment of the disclosure.

FIG. 7 illustrates a method 700 of obtaining, processing and performing matching of an image of an input object, such as a fingerprint. By way of example, matching may be used for biometric authentication or biometric identification. It will be appreciated that the steps and sequence of steps are by way of example only. Steps may be eliminated or the sequence modified without departing from the system and method of the present disclosure.

In step 702 the presence of an input object in contact with the sensing surface of the display is detected. Such detection may, for example, occur as the result of detection of changes of intensity in light received at detector pixels in the display. Alternatively, presence of the input object may be detected via capacitive sensing or other conventional techniques using a touch screen for example.

In step 704, the system and method may determine moisture content of the input object to be imaged. The moisture content can be determined, for example, by illuminating display pixels to determine the inner boundary of the high contrast area. By comparing the determined inner boundary of the high contrast to an expected boundary for a dry object, the relative moisture content can be estimated. The moisture content can be used for various purposes. For example, the detected moisture content can be used as a metric of expected image quality. The detected moisture content may also be used to establish the boundaries of high contrast and, therefore, used to establish which detector pixels will be used to collect data when a given display pixel is illuminated as part of the imaging process. The detected moisture content may also be used notify the user that a suitable image cannot be obtained. The user may then dry the object (e.g. finger) and initiate another imaging attempt.

In step 706, one or more display pixels are illuminated to image the input object. The display pixels illuminated and sequence of illumination depend on the pattern used. If a spatial pattern is used, multiple spatially separated display pixels are simultaneously illuminated. If a temporal pattern is used, display pixels are illuminated at different times. As previously described, the pattern used for imaging may include a combination of temporal and spatial patterns. For example, a first set of display pixels may be illuminated first where the corresponding high contrast areas are non-overlapping. This may then be followed by a second set of distinct display pixels being illuminated which likewise provide non-intersecting high contrast regions and so on. The display pixels illuminated and sequence of illumination may also be guided by a touch position detected by capacitive sensor or touch screen, for example.

It is further contemplated that multiple display pixels may be illuminated even though they provide overlapping high contrast areas. In such an arrangement, the display pixels transmit light of different wavelengths (e.g., colors), which can be separately detected to resolve different partial images of the object. Alternatively, techniques such as code division multiplexing may be used to transmit the light. In such an arrangement, the collected data may be de-convolved to resolve the different subparts of the fingerprint. Other methods to distinguish between light transmitted from different display pixels may be used provided that light transmitted from different display pixels can be detected and distinguished.

In step 708, the method obtains image data from appropriate detector pixels. The appropriate detector pixels will, for example, be the detector pixels in the corresponding high contrast region(s) for the display pixel(s) illuminated. However, as previously described, a region inside of the high contrast region may be used.

In step 710, a determination is made as to whether the pattern is complete. The pattern is complete when data for all of the partial images that will make up the entirety of a desired image of the object is collected. If the pattern is not complete, the process returns to step 706. In step 706, the next sequence in the process is initiated, for example, the next display pixel or set of display pixels is illuminated.

In step 712, the collected data for the various partial images undergo processing. By way of example, the processing may include demagnification of the image data and/or the application of weighting factors to the image data to account for the different intensities of light detected at detector pixels further away from the display pixels. The processing may further include combining the data for the various partial images into a complete image or creating a template that relates the partial images to one another even though they are kept separate. The image data from the various partial images may be combined according to the known geometric relationships between the pixels in the pattern. The image data may also be combined based on other parameters, such as the thickness of the cover layer, which provides additional information about the light beam paths from the illumination and detector pixels to the sensing surface to resolve physical transformations between the partial images. The thickness of the cover layer may be pre-defined or may be computed at image capture time based on the location of the inner boundary of the high contrast region. For example, the location of the inner boundary may be closer or further away from the illuminated display pixel for thinner or thicker cover layers, respectively.

In step 714, the image data may be compared to previously stored images of the object. For example, an image of a fingerprint taken during an authentication attempt may be compared to previously stored enrollment views of the fingerprint. If a match is detected, the user is authenticated. If a match is not detected, authentication may be denied. As another example, an image of a fingerprint taken during a control input may be compared to previously stored enrollment views of the fingerprint to identify which finger provided the input. If a match is detected to a specific finger, a finger specific display response or other device operation may then be initiated based on the identified finger.

As described in connection with FIG. 6, the user may be provided with feedback during the process described in connection with FIG. 7. For example, a colored border may be provided around the user's finger during imaging and/or while the authentication process is underway. Once those processes are complete, the color of the border may change to signify completion of imaging and the results of the authentication. For example, a green border signifies authentication is successful whereas a red border signifies that the authentication failed.

After image processing, the collected data for the object may be stored for later use.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, although a system and method are described for imaging an input object using a display, the system and method can be implemented as an imager that is separate from the display. Moreover, although the description is generally directed to imaging a fingerprint, the system and method may be used to image any object. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electronic device for imaging an input object, comprising:
 a display comprising a sensing surface and an array of display pixels;
 a processing system communicatively coupled to the display, the processing system configured to:
  selectively illuminate one or more of the display pixels according to a pattern;
  acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the processing system is configured to select the one or more detector pixels from a region surrounding the illuminated display pixels, the region being inside of an outer boundary that is defined by a first critical angle resulting from an interface between a surface of the input object and the sensing surface.

2. The electronic device of claim 1, wherein the input object is a biometric object.

3. The electronic device of claim 1, wherein the processing system is further configured to:

illuminate a portion of the display which at least partially surrounds the object in contact with the sensing surface such that the illuminated portion is visually perceptible.

4. The electronic device of claim 1, wherein the processing system is further configured to detect a condition of the input object by detecting a position of a high contrast region.

5. The electronic device of claim 1, wherein the processing system is further configured to detect presence of the input object and initiate the illumination of the display pixels based on the detected presence.

6. An electronic device for imaging an input object, comprising:

a display comprising a sensing surface and an array of display pixels;

a processing system communicatively coupled to the display, the processing system configured to:

selectively illuminate one or more of the display pixels according to a pattern;

acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the processing system is configured to select the one or more detector pixels from a region surrounding the illuminated display pixels, the region being outside of an inner boundary that is defined by a second critical angle resulting from an interface between air and the sensing surface.

7. An electronic device for imaging an input object, comprising:

a display comprising a sensing surface and an array of display pixels;

a processing system communicatively coupled to the display, the processing system configured to:

selectively illuminate one or more of the display pixels according to a pattern;

acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the processing system is configured to select the one or more detector pixels from a high contrast annular region surrounding the illuminated display pixels, the high contrast annular region being between an outer boundary and an inner boundary, the outer boundary defined by a first critical angle resulting from an interface between a surface of the input object and the sensing surface and the inner boundary being defined by a second critical angle resulting from an interface between air and the sensing surface.

8. An electronic device for imaging an input object, comprising:

a display comprising a sensing surface and an array of display pixels;

a processing system communicatively coupled to the display, the processing system configured to:

selectively illuminate one or more of the display pixels according to a pattern;

acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the pattern is time varying such that illumination of a first set of one or more display pixels is temporally spaced from illumination of a second set of one or more display pixels.

9. An electronic device for imaging an input object, comprising:

a display comprising a sensing surface and an array of display pixels;

a processing system communicatively coupled to the display, the processing system configured to:

selectively illuminate one or more of the display pixels according to a pattern;

acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the pattern is spatial and wherein the illuminate one or more display pixels further comprises:

illuminate a first set of one or more display pixels; and simultaneously illuminate a second set of one or more display pixels, wherein the first set of one or more display pixels is physically spaced apart from the second set of one or more display pixels.

10. An electronic device for imaging an input object, comprising:

a display comprising a sensing surface and an array of display pixels;

a processing system communicatively coupled to the display, the processing system configured to:

selectively illuminate one or more of the display pixels according to a pattern;

acquire image data, from one or more detector pixels of the display, of the input object in contact with the sensing surface, wherein the image data corresponds to light from the illuminated display pixels that is reflected at the sensing surface of the display; and process an image of the input object from the image data based upon the pattern, wherein the illuminate one or more of the display pixels further comprises:

illuminate a first set of one or more display pixels; and illuminate a second set of one or more display pixels, wherein the first set of one or more display pixels is physically spaced apart from the second set of one or more display pixels;

wherein the acquire the image data further comprises:
  acquire partial image data from a first set of detector pixels during illumination of the first set of one or more display pixels; and
  acquire partial image data from a second set of detector pixels during illumination of the second set of one or more display pixels; and
wherein the process the image comprises:
  combine the partial image data from the first set of detector pixels and the partial image data from the second set of detector pixels into composite image data.

11. The electronic device of claim 10, wherein the processing system is further configured to:
  compare the composite image data to an enrolled fingerprint template to determine a biometric match.

12. An electronic device for imaging an input object, comprising:
  a display comprising a sensing surface and an array of display pixels;
  a processing system communicatively coupled to the display, the processing system configured to:
    selectively illuminate one or more of the display pixels according to a pattern;
    acquire image data, from one or more detector pixels of the display, of the input object in contact with the sensing surface wherein the image data corresponds to light from the illuminated display pixels that is reflected at the sensing surface of the display; and
    process an image of the input object from the image data based upon the pattern,
  wherein the illuminate one or more of the display pixels further comprises:
    illuminate a first set of one or more display pixels; and
    illuminate a second set of one or more display pixels, wherein the first set of one or more display pixels is physically spaced apart from the second set of one or more display pixels;
  wherein the acquire the image data further comprises:
    acquire partial image data from a first set of detector pixels during illumination of the first set of one or more display pixels; and
    acquire partial image data from a second set of detector pixels during illumination of the second set of one or more display pixels; and
  wherein the process the image comprises:
    combine the partial image data from the first set of detector pixels and the partial image data from the second set of detector pixels into composite image data,
  wherein the combine the partial image data further comprises:
    determine an alignment between the partial image data from the first set of detector pixels and the partial image data from the second set of detector pixels based on a known spatial relationship between the first set of one or more display pixels and the second set of one or more display pixels.

13. An electronic device for imaging an input object, comprising:
  a display comprising a sensing surface and an array of display pixels;
  a processing system communicatively coupled to the display, the processing system configured to:
    selectively illuminate one or more of the display pixels according to a pattern;
    acquire image data, from one or more detector pixels of the display, of the input object in contact with the sensing surface wherein the image data corresponds to light from the illuminated display pixels that is reflected at the sensing surface of the display; and
    process an image of the input object from the image data based upon the pattern,
  wherein the processing system is further configured to detect a condition of the input object by detecting a position of a high contrast region, and
  wherein the condition is a moisture condition.

14. An electronic device for imaging an input object, comprising:
  a display comprising a sensing surface and an array of display pixels;
  a processing system communicatively coupled to the display, the processing system configured to:
    selectively illuminate one or more of the display pixels according to a pattern;
    acquire image data, from one or more detector pixels of the display, of the input object in contact with the sensing surface, wherein the image data corresponds to light from the illuminated display pixels that is reflected at the sensing surface of the display; and
    process an image of the input object from the image data based upon the pattern,
  wherein the processing system is further configured to determine a thickness of a cover layer by detecting an inner edge of a high contrast region.

15. An electronic device for imaging an input object, comprising:
  a display comprising a sensing surface and an array of display pixels;
  a processing system communicatively coupled to the display, the processing system configured to:
    selectively illuminate one or more of the display pixels according to a pattern;
    acquire image data, from one or more detector pixels of the display, of the input object in contact with the sensing surface, wherein the image data corresponds to light from the illuminated display pixels that is reflected at the sensing surface of the display; and
    process an image of the input object from the image data based upon the pattern,
  wherein the display further comprises an array of detector pixels distinct from the array of display pixels.

16. An electronic device for imaging an input object, comprising:
  a display comprising a sensing surface and an array of display pixels;
  a processing system communicatively coupled to the display, the processing system configured to:
    selectively illuminate one or more of the display pixels according to a pattern;
    acquire image data, from one or more detector pixels of the display, of the input object in contact with the sensing surface, wherein the image data corresponds to light from the illuminated display pixels that is reflected at the sensing surface of the display; and
    process an image of the input object from the image data based upon the pattern,
  wherein the one or more detector pixels are one or more reverse-biased display pixels from the array of display pixels.

17. An electronic device for imaging an input object, comprising:

a processing system configured to be communicatively coupled to a display, wherein the processing system is further configured to:
   selectively illuminate one or more display pixels of the display according to a pattern;
   acquire image data, from one or more detector pixels of the display, of the input object in contact with a sensing surface of the display, wherein the image data corresponds to light from the illuminated display pixels that is reflected at the sensing surface of the display; and
   process an image of the input object from the image data based upon the pattern,
wherein the processing system is configured to select the one or more detector pixels from a high contrast annular region surrounding the illuminated display pixels, the high contrast annular region being between an outer boundary and an inner boundary, the outer boundary defined by a first critical angle resulting from an interface between a surface of the input object and the sensing surface and the inner boundary being defined by a second critical angle resulting from an interface between air and the sensing surface.

18. An electronic device for imaging an input object, comprising:
a processing system configured to be communicatively coupled to a display, wherein the processing system is further configured to:
   selectively illuminate one or more display pixels of the display according to a pattern;
   acquire image data, from one or more detector pixels of the display, of the input object in contact with a sensing surface of the display, wherein the image data corresponds to light from the illuminated display pixels that is reflected at the sensing surface of the display; and
   process an image of the input object from the image data based upon the pattern,
wherein the illuminate one or more of the display pixels further comprises:
   illuminate a first set of one or more display pixels; and
   illuminate a second set of one or more display pixels, wherein the first set of one or more display pixels is physically spaced apart from the second set of one or more display pixels;
wherein the acquiring the image data further comprises:
   acquire partial image data from a first set of detector pixels during illumination of the first set of one or more display pixels; and
   acquire partial image data from a second set of detector pixels during illumination of the second set of one or more display pixels; and
wherein the process the image comprises:
   combine the partial image data from the first set of detector pixels and the partial image data from the second set of detector pixels into composite image data.

19. The electronic device of claim 18, wherein the combine the partial image data further comprises:
   determine an alignment between the partial image data from the first set of detector pixels and the partial image data from the second set of one or more detector pixels based on a known spatial relationship between the first set of one or more display pixels and the second set of one or more display pixels.

20. A method for imaging an input object comprising:
selectively illuminating one or more display pixels of a display according to a pattern;
acquiring image data, at one or more detector pixels of the display, of the object in contact with a sensing surface of the display, wherein the image data corresponds to light from the illuminated display pixels that is reflected at the sensing surface of the display; and
processing an image of the object from the image data based on the pattern,
wherein the one or more detector pixels are selected from a high contrast annular region surrounding the illuminated display pixels, the high contrast annular region being between an outer boundary and an inner boundary, the outer boundary defined by a first critical angle resulting from an interface between a surface of the input object and the sensing surface and the inner boundary being defined by a second critical angle resulting from an interface between air and the sensing surface.

21. A method for imaging an input object comprising:
selectively illuminating one or more display pixels of a display according to a pattern;
acquiring image data, at one or more detector pixels of the display, of the object in contact with a sensing surface of the display, wherein the image data corresponds to light from the illuminated display pixels that is reflected at the sensing surface of the display; and
processing an image of the object from the image data based on the pattern,
wherein the illuminating one or more of the display pixels further comprises:
   illuminating a first set of one or more display pixels; and
   illuminating a second set of one or more display pixels, wherein the first set of one or more display pixels is physically spaced apart from the second set of one or more display pixels;
wherein the acquiring the image data further comprises:
   acquiring partial image data from a first set of detector pixels during illumination of the first set of one or more display pixels; and
   acquiring partial image data from a second set of detector pixels during illumination of the second set of one or more display pixels; and
wherein the processing the image comprises:
   combining the partial image data from the first set of detector pixels and the partial image data from the second set of detector pixels into composite image data.

22. The method of claim 21, wherein the combining the partial image data further comprises:
   determining an alignment between the partial image data from the first set of detector pixels and the partial image data from the second set of one or more detector pixels based on a known spatial relationship between the first set of one or more display pixels and the second set of one or more display pixels.

23. The method of claim 21, further comprising:
comparing the composite image data to an enrolled fingerprint template to determine a biometric match.

24. An electronic device for imaging a fingerprint, comprising:
a display comprising a sensing surface, an array of display pixels and an array of detector pixels;
a processing system communicatively coupled to the display, the processing system configured to:

illuminate a first set of one or more of the display pixels and illuminate a second set of one or more of the display pixels;

acquire partial image data from a first set of the detector pixels during illumination of the first set of one or more display pixels and acquire partial image data from a second set of the detector pixels during illumination of the second set of one or more display pixels, wherein the first set of detector pixels is selected from a first region surrounding the first set of one or more display pixels, wherein the second set of detector pixels is selected from a second region surrounding the second set of one or more display pixels;

combine the partial image data from the first set of detector pixels and the partial image data from the second set of detector pixels into composite fingerprint image data; and compare the composite fingerprint image data to an enrolled fingerprint template to determine a biometric match.

25. The electronic device of claim 24, wherein the first region and the second region each have an outer boundary based on a first critical angle resulting from an interface between a ridge of the fingerprint and the sensing surface and an inner boundary based on a second critical angle resulting from an interface between a valley of the fingerprint and the sensing surface.

26. A method for imaging a fingerprint, the method comprising:

illuminating a first set of one or more display pixels of a display and illuminating a second set of one or more display pixels of the display;

acquiring partial image data from a first set of detector pixels of the display during illumination of the first set of one or more display pixels and acquiring partial image data from a second set of detector pixels of the display during illumination of the second set of one or more display pixels, wherein the first set of detector pixels is selected from a first region surrounding the first set of one or more display pixels, wherein the second set of detector pixels is selected from a second region surrounding the second set of one or more display pixels;

combining the partial image data from the first set of detector pixels and the partial image data from the second set of detector pixels into composite fingerprint image data; and comparing the composite fingerprint image data to an enrolled fingerprint template to determine a biometric match.

* * * * *